United States Patent Office 3,509,557
Patented Apr. 28, 1970

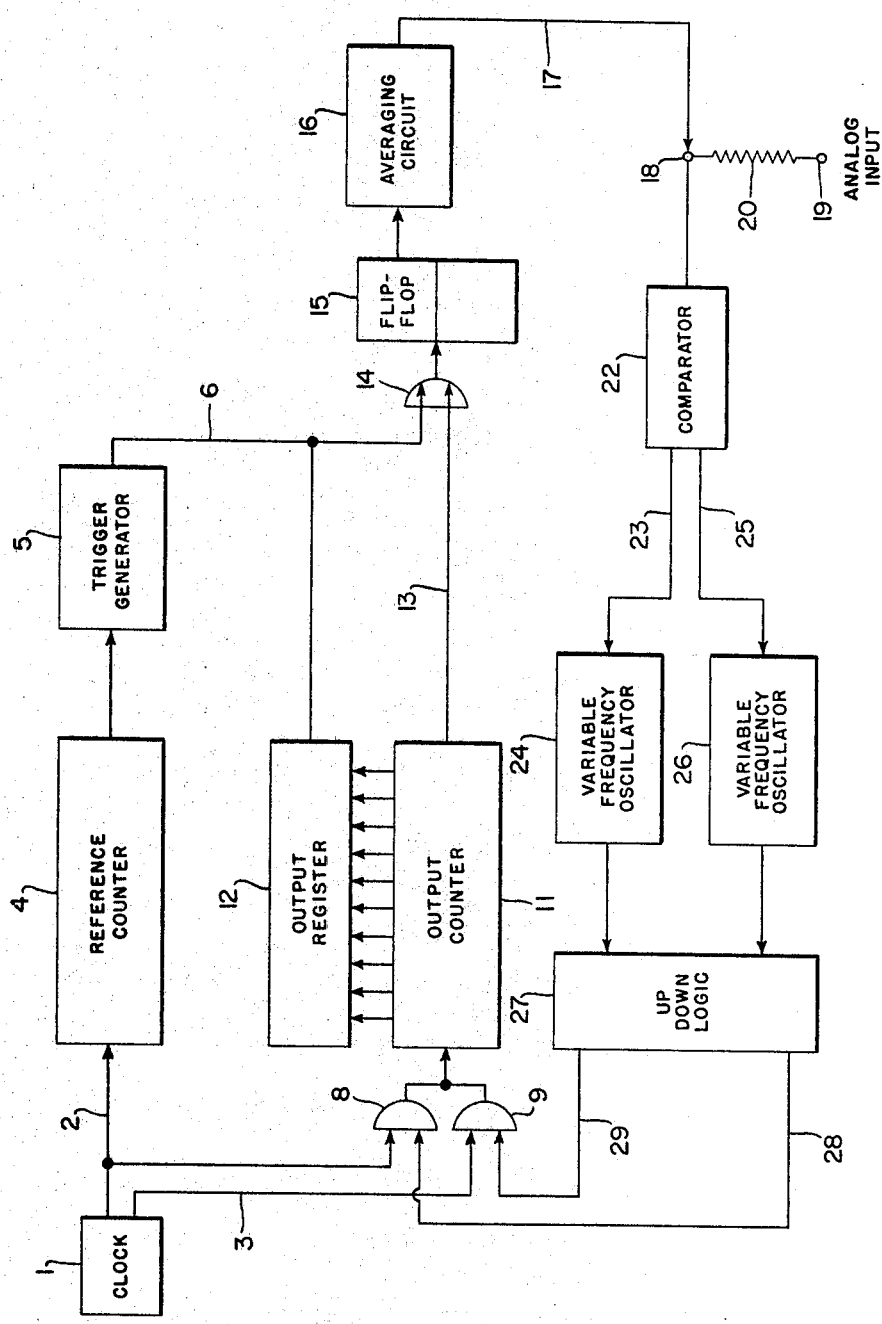

3,509,557
ELECTRICAL APPARATUS
William H. Groth, Douglasville, Pa., assignor to Honeywell Inc., Minneapolis, Minn., a corporation of Delaware
Filed Oct. 18, 1965, Ser. No. 496,969
Int. Cl. H03k 13/17
U.S. Cl. 340—347                    3 Claims

ABSTRACT OF THE DISCLOSURE

There is provided an analog to digital signal converter which produces a continuous digital output signal, which is representative of an analog input signal, by comparing a reference digital count with an unknown digital count representative of the analog signal, using the difference between the reference and unknown counts to produce a reference analog signal which is compared with the input analog signal, and using the difference between the reference and the input analog signals to control the unknown count until a balance of the counts is achieved to effect a balance of the analog signals.

---

This invention relates to data-handling apparatus. More specifically, the present invention relates to an analog to digital converter.

An object of the present invention is to provide an improved analog to digital converter.

Another object of the present invention is to provide an improved analog to digital converter for maintaining a continuous digital indication of the value of an analog input signal.

A further object of the present invention is to provide an improved analog to digital converter for providing a series of digital signals representative of the analog signal to be directly converted into a reference signal.

Still another object of the present invention is to provide an improved analog digital converter having a simple operation and construction.

In accomplishing these and other related objects, there has been provided, in accordance with the present invention, an analog to digital converter having an output counter, a reference counter and a clock for continuously driving the reference counter while varying the count in the output counter under control of a signal comparator which is effective to compare an input signal with a reference signal. The reference signal is obtained by averaging a series of digital pulses representative of the difference in count between the reference counter and the output counter. These digital pulses have a constant amplitude and a pulse width proportional to the aforesaid count difference.

A better understanding of the present invention may be had when the following detailed description is read in accordance with the accompanying drawing in which the single figure is a block diagram of an analog to digital converter embodying the present invention.

Referring to the single figure, there is shown an analog to digital converter, hereinafter referred to as an A/D converter, comprising a clock, or free-running oscillator, 1 arranged to produce a pulse train at a predetermined frequency; e.g., one megacycle. The output signals from the clock 1 are arranged to alternate between a pair of clock output lines 2, 3 at the aforesaid frequency. A first clock output line 2 is connected to the input circuit of a reference binary counter 4 arranged to count to one thousand at full scale. The output circuit of the reference counter 4 is connected to a trigger generator 5 to produce a trigger signal on line 6 for each full scale binary count. The first clock line 2 is also, connected to a first input signal terminal of AND gate 8. A second input signal is supplied to AND gate 8 to produce an AND gate output signal. This second input signal is discussed hereinafter.

The second clock line 3 is connected to a one input of a second AND gate 9 to supply a first input signal to be summed with a second signal supplied to AND gate 9 as described hereinafter. The output terminals of AND gates 8 and 9 are connected together and signals from the gates are applied to the input circuit of an output binary counter 11 similar to counter 4. The output counter 11 has individual binary output lines for connection to an output register 12 where the binary count is translated to a suitable code, such as a decimal indication. An output line 13 from the counter 11 is arranged to apply full scale binary count signals to an OR gate 14 as a first input signal. A second input signal for OR gate 14 is obtained from trigger generator 5 via line 6, which line is also connected to the output register 12.

The output signal from OR gate 14 is applied to the toggle input of flip-flop 15 to switch the flip-flop 15 between its alternate states. One output side of the flip-flop 15 is connected to an averaging circuit 16, e.g., an integrator. The output signal from the integrator 16 is applied along line 17 to a signal summing junction 18. An analog signal input terminal 19 is also, connected by a resistor 20 to the summing junction 18. An output signal from the junction 18, representative of the sum of the input signals applied thereto, is applied to a signal comparator circuit 22. The comparator 22 is effective to produce an output signal having a corresponding amplitude on one of a pair of output lines depending on the polarity of the comparator input signal, such devices being well-known in the art. A first comparator output line 23 is connected to transfer an input signal to a variable frequency oscillator 24 which is arranged to produce a variable frequency output signal proportional to the amplitude of an input signal thereto. A second comparator output line 25 is connected to a second variable frequency oscillator 26 which functions similarly to oscillator 24. The output signals from the oscillators 24 and 26 are applied to separate outputs of an up-down logic circuit 27 which is a conventional logic circuit having internal reset to provide a control signal on each of its output lines in response to signals from the oscillators 24 and 26. These output control signals from the up-down logic 27 are applied as the second input signals to the AND gates 8 and 9 over output lines 28, 29 respectively, to be summed with clock signals applied over lines 2 and 3 as suggested supra.

In operation, the analog to digital converter of the present invention is effective to provide a continuous digital indication which is representative of the analog input signal applied to input terminal 19. This digital indication may be obtained by translating the binary indication in the output counter 11 into a decimal indication on the register 12. Since the count in the output counter 11 comprises a thousand steps, the A/D converter is effective to produce a decimal indication of the analog input signal from 0 to 999. The clock 1, reference counter 4 and trigger generator 5 may be used with additional A/D converters comprising duplicates of the remainder of the block diagram shown in the drawing.

Basically, the converter of the present invention is arranged to provide a translated digital count in the output register 12 which is representative of the decimal value of the analog input signal on terminal 19. The output counter 11 is driven by the signals from clock 1 through a pair of gates 8 and 9. Gate 9 is arranged to selectively pass signals from line 3 of clock 1 while gate 8 is arranged to selectively inhibit signals on line 2 from clock 1. The reference binary counter 4, on the other hand, is continuously driven by one of the output signals from the clock 1 and counts every clock signal supplied via line 2. This clock signal is applied over line 2 to the gate 8 where it is summed as gated with a signal on line 28 from the up-down control logic 27. Gate 8 produces an output signal which is a function of the signals concurrently presented on lines 2 and 28. The up-down logic 27, in turn, is controlled by the output signals from a pair of variable frequency oscillators 24 and 26. The oscillators 24 and 26 have separate functions; i.e., oscillator 26 is effective to cause an increase in the analog reference signal supplied to the summing junction 18 while oscillator 24 is effective to decrease the analog reference signal at junction 18. The oscillators 24 and 26 may be any suitable device having an output signal which varies in frequency in proportion to the amplitude of an input signal applied thereto. The oscillators 24 and 26 are controlled by analog signal comparator means 22 which is arranged to sense the difference, or error, signal appearing at the summing junction 18 representative of the difference between the reference signal supplied via averaging circuit 16 and the analog input signal supplied at terminal 19. The comparator 22 is effective to produce separate output signals on line 23 or 25 to indicate the relative size of the compared signal as represented by the polarity of the difference signal. Thus, the signal on line 23 is indicative of a reference signal greater than the input signal and is used to trigger the down oscillator 24 to decrease the reference signal. Similarly, the signal on line 25 is indicative of a reference signal greater than the input signal and is used to increase the reference signal supplied to junction 18. Further, since the oscillators 24 and 26 are effective to produce a variable signal with a frequency proportional to the amplitude of an oscillator input signal, the larger error signals are effective to produce a faster conversion operation with a subsequent reduction in speed of conversion as a balance is reached between the reference signal on line 17 and the input signal at terminal 19.

The reference signal is produced by an averaging circuit 16 which may be a simple RC filter with a time constant larger than the period of the output counter 11. The average DC level obtained from the averaging circuit 16 is in opposition to the input signal applied to the input terminal 19. The input signal to the averaging circuit 16 is obtained from a flip-flop current switch 15 as a pulse train having a constant amplitude and a pulse duration which varies in proportion to the difference in count between the two counters 4 and 11 at the time the counter 11 reaches its full scale count, that is, in proportion to the interval between the time at which the reference counter 4 reaches its full scale count and actuates the flip-flop 15 to one of its states and the time at which the output counter 11 reaches its full scale count and actuates the flip-flop 15 to its other state. Thus, the output signal from the flip-flop 15 is taken from one side thereof which side is switched on alternately by a flip-flop input signal from the OR gate 14. This input signal is applied to the complementing input of the flip-flop 15 to change its state for each successive input signal from the gate 14. Thus, the time, or period, that the flip-flop 15 is in the "on" state is effective to deliver a signal to the averaging circuit 16. The duration of the "on" state is, accordingly, determined by the spacing of the complementing signals from the gate 14. Since the clock 1 has a fixed frequency of operation, the spacing of the turn-off signal from the OR gate 14 is controlled by the logic circuit 27 which is effective to add or subtract a clock pulse for the counter 11 by controlling the clock gates 8 and 9. In other words, the signal from the trigger generator 5 indicating a count cycle in the reference counter 4 is effective to turn-on the flip-flop 15 while the duration of the pulse delivered to the averaging circuit 16 is determined by the next signal from the output counter 11.

In order to vary this duration, the up-down logic 27 is used to vary the count in the output counter 11 by either introducing an additional input pulse or blanking an input pulse. Clock line 3 represents a source of pulses which may be selectively introduced into the output counter 11 through gate 9 to increase the count in counter 11 while clock line 2 may be blocked at a suitable time by gate 8 to prevent a pulse from being introduced into output counter 11 such that the count is not increased. This change in count or count rate is controlled by the output signals from the oscillators 24 and 26 which are selectively energized by the comparator 22. Thus, when the reference signal on line 17 is equal to the analog input signal at terminal 19, the output signal from the comparator 22 is terminated and neither one of the oscillators 24 or 26 is energized. This condition is effective to place the up-down logic 27 in a state which allows the first gate 8 to be continuously enabled whereby the signals from the clock line 2 are all applied to the output counter 11 at the same rate they are applied to counter 4. In this state, whatever difference in count existed between counters 4 and 11 is retained, and the duration of the pulse train from the flip-flop 15 is, also, maintained at the value which produces the required output from the averaging circuit 16 to balance the input signal. Thus, the flip-flop 15 is triggered between alternate states with a duration determined by the difference in count between counter 4 and 11 to produce a balance reference signal from the averaging circuit 16.

At the end of the count of the reference counter and the output counter, an appropriate clock signal is admitted to or blocked from the output counter 11. For example, in order to increase the reference signal, the duration of the signal from the flip-flop 15 should be increased. This is achieved by eliminating a clock pulse from the output counter 11. Thus, the oscillator 26 is actuated by the comparator 22 to produce a signal which is fed to the up-down logic 27. The up-down logic 27 is arranged to block gate 8 for the time of one clock pulse and to reset itself to allow the next clock pulse to pass therethrough. The oscillators 24 and 26 are arranged to operate at a substantially lower frequency than the clock 1. Thus, several clock signals may be fed to the output counter 11 before the gate 8 is again blocked to delete a clock pulse. This blocking of clock pulses will continue until the averaging circuit output signal balances the input signal.

In the case of a reference signal greater than the input signal, the comparator 22 is arranged to actuate the oscillator 24. The output of oscillator 24 is effective to operate the up-down logic 27 to unblock gate 9 by supplying a signal via line 29. The open state of gate 9 allows an alternate as complement clock signal on line 3, which occurs between the clock signals on line 2, to be admitted to the output counter 11. The admitting of this alternate clock pulse to counter 11 increases its count in order to decrease the duration of the signal applied to the averaging circuit 16 and, consequently, the reference signal produced thereby. The up-down logic 27 resets after the introduction of this additional pulse through gate 9 to block gate 9 while gate 8 continues to admit further clock pulses on line 2. As previously mentioned, the trigger signal on line 6 is used to actuate the output register 12 to produce a decimal indication of the count at output counter 11 which is representative of the value of the analog signal.

Subject matter shown but not claimed herein is shown and claimed in either copending applications of William H. Groth, Ser. No. 497,369 and Ser. No. 496,995, filed on even date herewith.

Accordingly, it may be seen that there has been provided, in accordance with the present invention, an analog to digital converter having a continuous digital indication of the value of an analog input signal while providing a direct conversion of a digital count into an analog reference signal representative of an input signal.

What is claimed is:

1. An analog to digital converter comprising a reference counter, a clock means having two independent and alternate output signals, means connecting one of said output signals as an input signal to said reference counter, an output counter, each of said output counter and said reference counter providing output signals upon the attainment of a predetermined count thereby, first gating means arranged to selectively apply said clock output signals as input signals to said output counter, said first gating means including a first AND gate for applying one of said clock signals to said output counter under the control of a first control signal and a second AND gate for applying the other of said clock signals to said output counter under the control of a second control signal, signal averaging means, second gating means connected to receive the output signals from said reference counter and said output counter and arranged to produce a signal having a duration determined by the difference in the time of occurrence of output signals from said output counter and said reference counter, said signal averaging means being connected to said second gating means to produce a reference signal which is a function of the duration of the signal produced by said second gating means, signal comparing and logic means arranged to compare said reference signal with an input signal to be converted to selectively generate said first and second control signals accordingly as said reference signal is greater or less than the input signal to be converted, thereby to control said first gating means to vary the count in said output counter with respect to the count in said reference counter, and digital output means connected to said output counter to receive count signals therefrom and controlled by said output signal from said reference counter to provide a digital representation of the count in said output counter and thereby a representation of the input signal to be converted.

2. An analog to digital converter as set forth in claim 1 wherein said signal comparing and logic means includes a signal comparator having two separate output signals corresponding to the relative sense of said reference signal and said input signal and having an amplitude proportional to the difference in amplitude between said reference signal and said input signal, a first variable frequency oscillator arranged to respond to one of said comparator output signals, a second variable frequency oscillator arranged to respond to the other one of said comparator output signals, and a logic circuit controlled by said oscillators for generating said first and second control signals.

3. In combination, pulse supplying means, first and second counting means connected to said pulse supplying means to receive pulses therefrom, means for supplying pulses directly from said pulse supplying means to one of said counting means, switch means, said first and second counting means providing signals to said switch means as a result of the counting operation of said counting means, source means connected to said switch means to supply a signal representative of the condition of said switch means, signal generating means having two separate outputs, input signal means, said input signal means and said source means being differentially connected to said signal generating means to selectively produce signals in one or the other of the outputs of said signal generating means in accordance with the relationship between the signals produced by said source means and said input signal means, and control means connected to the outputs of said signal generating means and responsive to the signals generated therein, said control means being connected between said pulse supplying means and the other of said counting means for supplying pulses from said pulse supplying means to said other counting means for thereby selectively altering the counting operation of said other counting means in one direction or the other in response to a corresponding one of the output signals of said signal generating means.

References Cited

UNITED STATES PATENTS

| | | | |
|---|---|---|---|
| 2,836,356 | 5/1958 | Forrest et al. | 340—347 X |
| 3,028,550 | 4/1962 | Naydan et al. | 340—347 X |
| 3,042,911 | 7/1962 | Paradise et al. | 340—347 |
| 3,148,366 | 9/1964 | Schulz | 340—347 |
| 2,718,634 | 9/1955 | Hansen | 340—347 |

DARYL W. COOK, Primary Examiner

G. EDWARDS, Assistant Examiner